US009424647B2

(12) United States Patent
Flint et al.

(10) Patent No.: US 9,424,647 B2
(45) Date of Patent: Aug. 23, 2016

(54) VISUAL-BASED INERTIAL NAVIGATION

(71) Applicants: Apple Inc., Cupertino, CA (US); Regents of the University of Minnesota, Minneapolis, MN (US)

(72) Inventors: Alex Flint, New York, NY (US); Oleg Naroditsky, Brooklyn, NY (US); Christopher P. Broaddus, The Woodlands, TX (US); Andriy Grygorenko, Jersey City, NJ (US); Stergios Roumeliotis, Saint Paul, MN (US); Oriel Bergig, D.N. Lachis (IL)

(73) Assignees: Apple Inc., Cupertino, CA (US); Regents of the University of Minnesota, Minneapolis, MN (US)

( * ) Notice: Subject to any disclaimer, the term of this patent is extended or adjusted under 35 U.S.C. 154(b) by 190 days.

(21) Appl. No.: 14/457,286

(22) Filed: Aug. 12, 2014

(65) Prior Publication Data
US 2015/0043784 A1 Feb. 12, 2015

Related U.S. Application Data

(60) Provisional application No. 61/864,754, filed on Aug. 12, 2013.

(51) Int. Cl.
*G01C 21/16* (2006.01)
*G06K 9/00* (2006.01)
*G06T 7/00* (2006.01)
*G01C 21/20* (2006.01)

(52) U.S. Cl.
CPC .............. *G06T 7/0042* (2013.01); *G01C 21/16* (2013.01); *G01C 21/165* (2013.01); *G01C 21/206* (2013.01); *G06K 9/00664* (2013.01); *G06K 9/00671* (2013.01)

(58) Field of Classification Search
None
See application file for complete search history.

(56) References Cited

U.S. PATENT DOCUMENTS

| 8,442,765 | B1 * | 5/2013 | Ingvalson | G06F 17/30873 |
| | | | | 342/357.28 |
| 9,277,361 | B2 * | 3/2016 | Fung | H04W 4/026 |
| 9,303,999 | B2 * | 4/2016 | Hesch | G01C 21/165 |
| 2002/0198632 | A1 | 12/2002 | Breed et al. | |
| 2009/0248304 | A1 * | 10/2009 | Roumeliotis | G01C 21/16 |
| | | | | 701/500 |

(Continued)

FOREIGN PATENT DOCUMENTS

WO WO2006122009 A2 11/2006
WO WO2012049492 A1 4/2012

OTHER PUBLICATIONS

International Search Report and Written Opinion for Int. App. No. PCT/US2014/050649, mailed Feb. 19, 2015.

(Continued)

*Primary Examiner* — Utpal Shah
(74) *Attorney, Agent, or Firm* — Blank Rome LLP

(57) ABSTRACT

A method includes: receiving sensor measurements from a pre-processing module, in which the sensor measurements include image data and inertial data for a device; transferring, using a processor, information derived from the sensor measurements, from a first set of variables associated with a first window of time to a second set of variables associated with a second window of time, in which the first and second windows consecutively overlap in time; and outputting, to a post-processing module, a state of the device based on the transferred information.

28 Claims, 11 Drawing Sheets

(56) References Cited

U.S. PATENT DOCUMENTS

2013/0216098 A1* 8/2013 Hasegawa ............ G05D 1/0274 382/103
2014/0341465 A1* 11/2014 Li ...................... G06K 9/00664 382/160

OTHER PUBLICATIONS

Engels et al., "Bundle Adjustment Rules", Photogrammetric Computer Vision, vol. 2, (2006), 6 pages.

Leutenegger et al., "Keyframe-Based Visual-Inertial SLAM Using Nonlinear Optimization", Proceedings of Robotics: Science and Systems (RSS), (2013), 8 pages.

Mourikis and Roumeliotis, "A Multi-State Constraint Kalman Filter for Vision-aided Inertial Navigation", Robotics and Automation, 2007 IEEE International Conference, (Apr. 10-14, 2007), 8 pages.

Sibley et al., "A Sliding Window Filter for Incremental SLAM", Unifying Perspectives in Computational and Robot Vision, Springer US, pp. 103-112, (2008).

Triggs et al., "Bundle Adjustment—A Modern Synthesis", Vision Algorithms: Theory and Practice, LNCS, Springer Verlag, pp. 298-375. (2000).

* cited by examiner

VISUAL-BASED INERTIAL NAVIGATION

CROSS-REFERENCE TO RELATED APPLICATIONS

This application claims priority to U.S. Application Ser. No. 61/864,754, filed Aug. 12, 2013, the contents of which are incorporated herein by reference in their entirety.

BACKGROUND

As portable computing devices, such as smart phones, smart glasses and other devices, become more ubiquitous, there is an interest to provide such devices with localization and mapping capabilities. Localization can be partially addressed by relying on systems that use global positioning system (GPS) signals or triangulation of cell tower signals to calculate position. Mapping can be partially addressed with enterprise solutions, such as having cars configured with specialized equipment drive through and map streets. Localization and mapping benefit consumers with maps and location-based services. However, such services tend to be limited to use outdoors, since GPS signals or cell tower signals may be blocked within buildings, and since mapping for portable computing devices typically has not extended to indoor environments. Moreover, commercial localization and mapping services are generally unable to provide accuracy higher than several meters with respect to position.

Visual-based inertial navigation systems rely on information obtained from images and inertial measuring devices in order to achieve localization and/or mapping. Since visual-based inertial navigation systems do not require signals from GPS or cell towers, such systems may be used indoors where GPS and cell signals cannot reach or are unavailable due to interference. Furthermore, visual-based inertial navigation systems enable very high position accuracy, e.g., on the order of centimeters. However, visual-based inertial navigation systems are typically computationally intensive as they need to process large amounts of image data acquired from an image detector, such as a camera, and inertial readings generated by an inertial measurement unit (IMU), all in real-time. In addition, to achieve highly accurate measurements of position, a history of information related to previous poses (positions and orientations), inertial measurements and image features is typically stored, thus requiring devices to use a substantial amount of memory and consequently large computation time to process this information.

SUMMARY

The present disclosure relates to visual-based inertial navigation.

In general, in a first aspect, the subject matter of the disclosure may be embodied in an electronic computing system for performing navigation, in which the electronic computing system includes an electronic processor and memory operable to implement a sliding-window inverse filter module, and in which the sliding-window inverse filter module is configured to: receive sensor measurements from a pre-processing module, in which the sensor measurements comprise image data and inertial data for a device; transfer information, derived from the sensor measurements, from a first set of variables associated with a first window of time to a second set of variables associated with a second window of time, in which the first and second windows consecutively overlap in time; and output, to a post-processing module, a state of the device based on the transferred information. Each window in the pair is associated with a corresponding first information matrix, and each first information matrix is for multiple first variables representing a position and/or orientation of at least one object proximate to the device and multiple second variables representing a state of the device at two or more points in time. Transferring the information includes: marginalizing at least a subset of the first variables associated with the first information matrix of the first window to obtain a second information matrix, which still maintains the association with multiple second variables; marginalizing a subset of the second variables associated with the second information matrix to obtain a third information matrix; and scaling the third information matrix to obtain a fourth information matrix, in which the fourth information matrix is a summarized representation of the state of the device and of the position and/or orientation of the objects proximate to the device at points in time when the first window and the second window in the pair overlap.

In another aspect, the subject matter of the disclosure may be embodied in a computer-implemented method that includes: receiving sensor measurements from a pre-processing module, in which the sensor measurements comprise image data and inertial data for a device; transferring, using a processor, information derived from the sensor measurements, from a first set of variables associated with a first window of time to a second set of variables associated with a second window of time, in which the first and second windows consecutively overlap in time; and outputting, to a post-processing module, a state of the device based on the transferred information, in which each window in the pair is associated with a corresponding first information matrix, and each first information matrix is for multiple first variables representing a position and/or orientation of at least one object proximate to the device and multiple second variables representing a state of the device at two or more points in time. Transferring the information includes: marginalizing at least a subset of the first variables associated with the first information matrix of the first window to obtain a second information matrix, which still maintains the association with the multiple second variables; marginalizing a subset of the second variables associated with the second information matrix to obtain a third information matrix; and scaling the third information matrix to obtain a fourth information matrix, in which the fourth information matrix is a summarized representation of the state of the device and of the position and/or orientation of the objects proximate to the device at points in time when the first window and the second window in the pair overlap.

In another aspect, the subject matter of the disclosure may be embodied in a non-transitory computer storage medium encoded with computer program instructions that when executed by one or more electronic computing devices cause the one or more electronic computing devices to perform operations that include: receiving sensor measurements from a pre-processing module, in which the sensor measurements comprise image data and inertial data for a device; transferring, using a processor, information derived from the sensor measurements, from a first set of variables associated with a first window of time to a second set of variables associated with a second window of time, in which the first and second windows consecutively overlap in time; and outputting, to a post-processing module, a state of the device based on the transferred information, in which each window in the pair is associated with a corresponding first information matrix, and each first information matrix is for multiple first variables representing a position and/or orientation of at least one object proximate to the device and multiple second variables representing a state of the device at two or more points in time. Transferring the information includes: marginalizing at least a subset of the first variables associated with the first information matrix of the first window to obtain a second information matrix, which still maintains the association with the multiple second variables; marginalizing a subset of the second variables associated with the second information matrix to obtain a third information matrix; and scaling the third information matrix to obtain a fourth information matrix, in which the fourth information matrix is a summarized representation of the state of the device and of the position and/or orientation of the objects proximate to the device at points in time when the first window and the second window in the pair overlap.

Implementations of the methods, media, and/or systems can include one or more of the following features and/or features of other aspects. For example, in some implementations, the electronic computing system may further include: the pre-processing module, an image detection unit coupled to the pre-processing module, in which the pre-processing module is configured to receive multiple images captured by the image detection unit and derive the image data from multiple images; and a motion sensing unit coupled to the pre-processing module, in which the pre-processing module is configured to receive the inertial data from the motion sensing unit.

In some implementations, a subset of the first set of variables associated with the first window overlaps in time with a subset of the second set of variables associated with the second window. The period of overlap can correspond to any period of time that is present in both the first and second windows. In particular it may correspond to the set of variables with the earliest time that is present in both the first and second windows.

In some implementations, for each window, the multiple first variables represent 3D positions and/or orientations of image features across multiple images, and the multiple second variables include acceleration data and angular velocity data. The state of the device may further include intrinsic and extrinsic parameters for both sensing devices (e.g., biases for the motion sensing unit and the relative pose of the motion unit with respect to the camera).

In some implementations, the first information matrix associated with each window includes: first information about at least one variable representing an estimate for a position or orientation of an object proximate to the device; and second information about at least one variable representing an estimate of the state of the device; and shared information between the first information and the second information. The shared information may represent shared confidence between the estimates of a position or orientation of an object proximate to the device and the estimate of the state of the device. Marginalizing at least the subset of the first variables associated with the first information matrix of the first window may include marginalizing the corresponding shared information. Scaling the third information matrix may include dividing or multiplying the third information matrix by a constant. The constant may be equal to a size of the first window, such as the number of measurements captured in the first window or the length of time associated with the first window.

Certain implementations may have particular advantages. For example, in some implementations, the techniques disclosed herein enable maintaining information about the constraints between the inertial state of a device at different times and the position and/or orientation of observed objects proximate to the device, without requiring simultaneous processing all constraints generated over a long period of time. Moreover, despite reducing the number of past variables over which the constraints are processed, the present techniques enable the calculation of highly-accurate estimates for the inertial state of the device at a present time (e.g., positional errors on the order of centimeters) while avoiding overconfidence in the same.

Unless otherwise defined, all technical and scientific terms used herein have the same meaning as commonly understood by one of ordinary skill in the art to which the presently disclosed subject matter belongs. Although methods, materials, devices and systems similar or equivalent to those described herein can be used in the practice or testing of the present invention, suitable methods, materials, devices and systems are described below. All publications, patent applications, patents, and other references mentioned herein are incorporated by reference in their entirety. In addition, the examples set forth herein are for illustrative purposes and not intended to be limiting.

The details of one or more implementations are set forth in the accompanying drawings and the description below. Other features and advantages will be apparent from the description, the drawings, and the claims.

DETAILED DESCRIPTION

Figure 1:
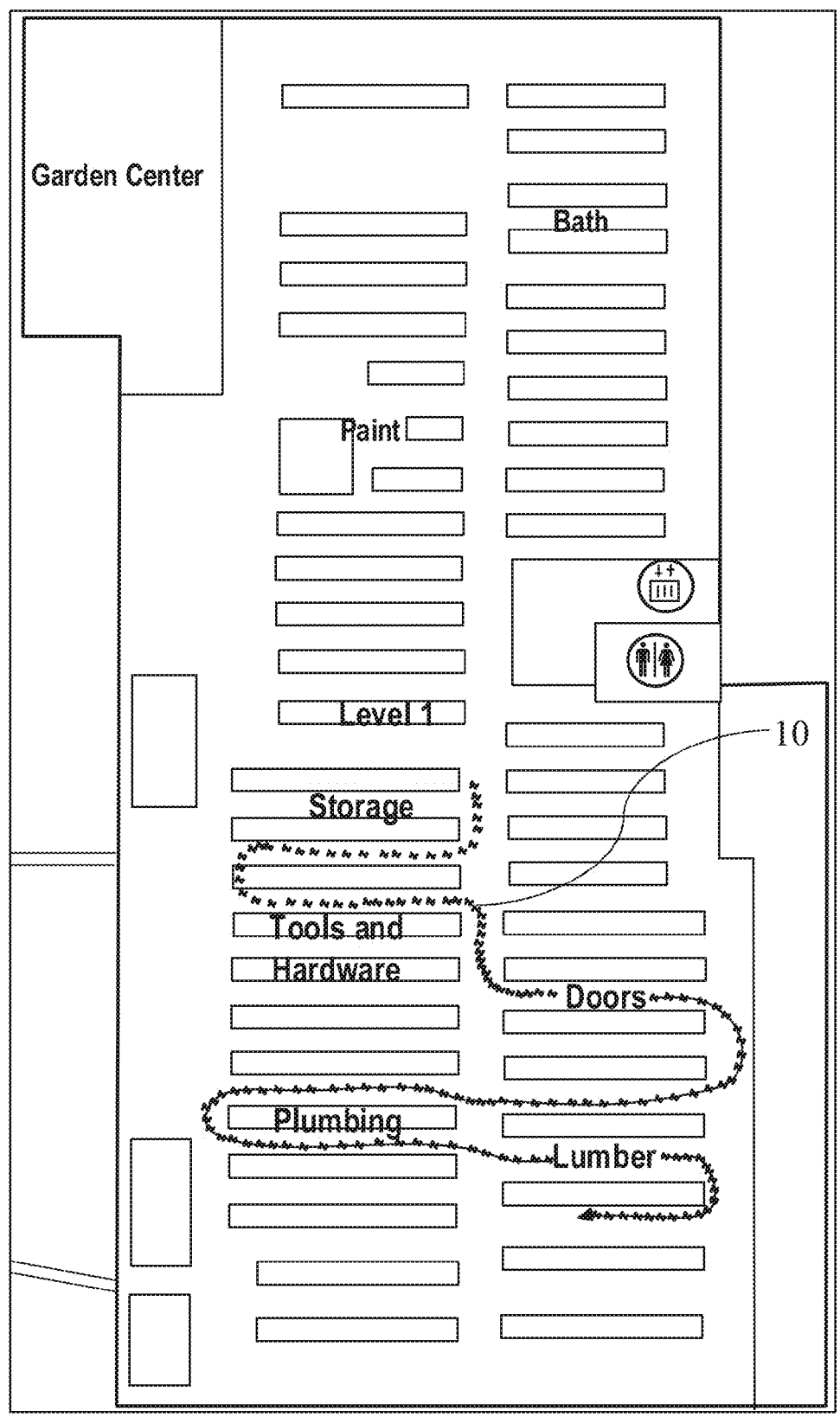
FIG. 1 is a schematic illustrating a floor plan overlaid with a path computed by a visual-based inertial navigation system.

For visual-based inertial navigation systems, information about position and orientation of a device at one time, or the 3D position of observed image features, tends to be highly correlated with information about the position and orientation of the device at a previous time, since it is often the case that features within a presently captured image can be found in one or more previous images. Such correlations, which are mathematically expressed in the forms of deterministic or stochastic measurement constraints, can be used to enhance the accuracy of estimates of the position and orientation of a device within a visual-based inertial navigation system. Processing those measurements, however, can be computationally burdensome, especially for devices (such as wearable computing devices) that may have limited computation power. In addition, such devices may utilize low-end cameras/detectors and IMUs, which suffer from nonlinearities, increasing the need for even more past data to be maintained and processed concurrently so that highly-accurate estimates can be produced. As the number of images and inertial readings increases, the computation can become intractable.

The techniques disclosed herein cover methods for maintaining information about the constraints between the inertial state of a device at different times and the position and/or orientation of objects proximate to the device that are observed in a visual-based inertial navigation system, without requiring the system to simultaneously process all constraints generated over a long period of time. Moreover, despite reducing the number of past variables over which the constraints are processed, the present techniques enable the calculation of highly-accurate estimates for the inertial state of the device at the present time (e.g., position errors on the order of centimeters) while avoiding overconfidence in the same.

To minimize the number of past variables over which the constraints are optimized, a sliding window inverse filter (SWF) is used, in which the SWF processes information from overlapping windows of images, as the images are captured by a visual-based inertial navigation system operating on an electronic computing device (e.g., a smartphone, electronic tablet device, or smart glasses). Using features tracked in the images and corresponding information obtained from an IMU also operating on the device, the SWF obtains estimates for the inertial state of the device (e.g., position, orientation, velocity, and/or gyro and accelerometer biases), which may be referred to as simply the "state" of the device. The SWF also obtains estimates for position and/or orientation of objects proximate to the device, in which the objects, in one instance, are represented as 3D positions of features that are being tracked between the images. The estimates for the device inertial state and for the objects' position and/or orientation are calculated for each image in a window of images. For each window of images, the SWF then summarizes these estimates by converting them into estimates about the state of the device at a single point in time T. For a pair of windows, the information summarized from the first window can then be carried forward to the second window, provided that the pair of windows overlaps in at least one same point in time T. Information summarized from the first window can then be used in subsequent processing steps on the second window for estimating the state of the device in other points in time. The process of summarizing and transferring information between pairs of overlapping windows hence maintains information about the constraints between the inertial state of a device and the position and/or orientation of objects proximate to the device at different times while minimizing the number of past variables over which the constraints are optimized.

FIG. 1 is a schematic illustrating a floor plan overlaid with a path 10 computed by an electronic computing device having a visual-based inertial navigation system configured according to the present disclosure. The floor plan is an overview of a generic hardware store including the different sections (e.g., plumbing section, tools and hardware section, etc.), where the shaded regions represent shelves and the white regions represent the aisles and other areas of the store in which a customer may move. The device may be a portable electronic computing device (e.g., a camera phone, smartphone, smart glasses, a head mounted display, or a surveying device) that records images as the person moves through the store. The portable electronic computing device also includes an IMU having components (e.g., accelerometer(s) and gyroscope(s)) that record inertial data such as linear acceleration and angular velocity of the device. During recording of the images and inertial data, the visual-based inertial navigation system calculates and stores estimates of the state of the computing device relative to a starting point, a process commonly referred to as "dead reckoning." The positions may be used to compute the path 10, which is stored in memory of the device and/or overlaid on an image of the floor plan, as shown in FIG. 1, and which can be output to a display for a user to view.

Figure 2:
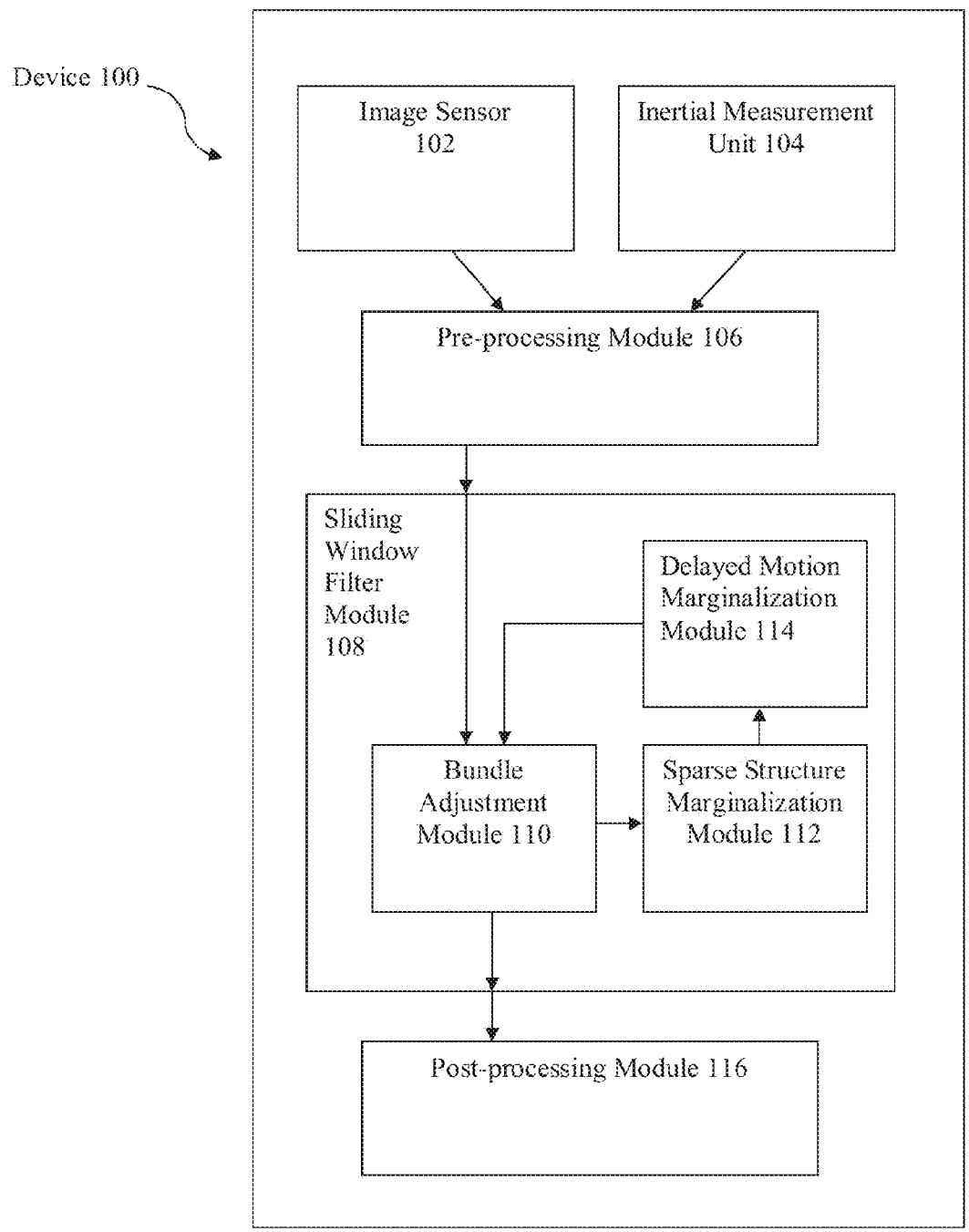
FIG. 2 is a schematic illustrating an example of a visual-based inertial navigation device.

FIG. 2 is a schematic illustrating an example of a visual-based inertial navigation device 100, such as the electronic computing device that may be used to produce the path 10 of FIG. 1. The device 100 includes multiple components that make up a visual-based inertial navigation system. For example, the device 100 includes an image sensor 102 that converts an optical image into an electronic signal, such as a digital camera. The sensor 102 may utilize any appropriate image sensing components, such as a digital charge-coupled device (CCD), complementary metal-oxide-semiconductor (CMOS) pixel sensors or infrared sensors. Alternatively, the image sensor 102 may include a depth sensor, a stereo camera pair, a flash lidar sensor, a laser sensor, or any combination of these. The image sensor 102 may be formed entirely in hardware or may also be configured to include software for modifying detected images. The device 100 also includes an inertial measurement unit 104. The IMU 104 may include several electronic hardware components, including a tri-axial gyroscope and accelerometer, for recording inertial data of the device 100. For example, the IMU 104 may measure and report on the device's six degrees of freedom (X, Y, and Z Cartesian coordinates of the device's acceleration, and roll, pitch, and yaw components of the device's angular velocity). The IMU 104 may output other inertial data, as well. Various IMUs are commercially available or are pre-installed on portable electronic computing devices.

Device 100 also includes a pre-processing module 106 that receives images detected from the image sensor 102 and the inertial data recorded by the IMU 104. Images recorded by the image sensor 102 and processed by the module 106 may also be referred to as "frames." The pre-processing module 106 can be electronic hardware, software, or a combination of both electronic hardware and software. Among other things, the pre-processing module 106 performs feature tracking within the recorded frames and associates the inertial data with the frames themselves. An image feature corresponds to the image coordinates (e.g., the x-y coordinates) representing a particular location/pixel or a group of pixels of an object or a portion of an object in a frame. The pre-processing module 106 calculates "feature tracks," in which a feature track is a sequence of two-dimensional points representing the locations of a single feature tracked across two or more frames obtained by the image sensor 102. The pre-processing module 106 generates feature tracks by identifying one or more image features in a first frame and then matching those one or more image features with one or more corresponding image features in consecutive frames. Various techniques known in the art may be used to obtain feature tracks. For example, the identification of image features may be performed by evaluating a scoring function (such as the scoring function used in the Harris corner detector or the Laplacian operator) for each pixel and then designating pixels that have a larger score than any of their neighboring pixels as the image features. Image features can then be matched between frames by comparing a rectangular array of pixels (or a function of them) centered around the image feature in a first frame with a rectangular array of pixels (or a function of them) centered at an image feature in a different frame. By matching image features over successive pairs of frames, the pre-processing module 106 builds up a list of feature tracks, with each feature track containing a sequence of image feature locations across the frames. The number of feature tracks identified by the module 106 may vary and, in some implementations, can depend on the end-user application for which the visual-based inertial navigation system is being used.

The pre-processing module 106 also is configured to select a subset of the frames received from the image sensor 102 as "keyframes." A keyframe is any frame selected as such by the pre-processing module. For example, for a sequence of 10 frames received from the image sensor 102, the pre-processing module 102 may designate the first and last frames as keyframes. A frame may be designated as a keyframe by the module 106 based on one or more parameters, such as a desired keyframe frequency, or statistics related to the number of image features identified in a current frame or matched in a pair of frames. Other decision rules for selecting keyframes may also be used. The pre-processing module 106 further organizes a sequence of keyframes into groups of K consecutive keyframes, where K is a pre-defined parameter. Each group of keyframes (i.e., set of images) may be referred to as a window. As images are received from the image sensor 102, the module 106 may organize keyframes into groups of overlapping windows, where each incoming window overlaps a prior window by at least 1 keyframe and not more than M keyframes. M is a parameter that can take values between 1 and K. For example, assuming K equals 5 and M equals 3, a first window created by the module 106 may include keyframes (1,2,3,4,5), whereas a second window may include keyframes (3,4,5,6,7), and a third window may include keyframes (4,6,7,8,9). Thus, between the first and second window, there are three overlapping keyframes (i.e., keyframes 3, 4, and 5), and between the second and third window, there are also three overlapping keyframes (i.e., keyframes 4, 6, and 7). Furthermore, as seen in the foregoing example, the keyframes selected by the pre-processing module 106 do not have to be consecutive. Instead, one or more keyframes may be dropped or ignored. Moreover, the values of K (size of the window) and M (number of overlapping keyframes) may vary with time.

The pre-processing module 106 associates each feature track with a binary vector (e.g., a vector of 1's and 0's representing a status of "true" and "false," respectively) of length equal to the number of keyframes in the current window. The binary vector indicates which keyframes of a window include the tracked image feature. For example, if the window size is 5 and the current window being processed contains keyframes (3,4,5,6,7), then one feature track may be recognizable at different locations in 3 keyframes (5,6,7) of the five total keyframes in the window. This particular feature track will have a binary vector of size 5 associated with it, such as (0, 0, 1, 1, 1) with the two leading 0's indicating that the feature was not observed in keyframes 3 and 4, and the following three 1's indicating that the feature was observed in keyframes 5, 6, and 7. The binary vector then may be used during later position and orientation calculations to indicate the presence of spurious image features (outliers). That is, the feature locations associated with FALSE elements (i.e., 0) in this vector will be ignored, whereas feature locations associated with TRUE elements (i.e., 1) will be used for further calculations. For example, if the 2D location of the feature track on keyframe 6 in the window of keyframes (3,4,5,6,7) is determined as an outlier at some point during processing, the keyframe 6 will then be marked in the binary vector as false, such that the vector changes to (0, 0, 1, 0, 1), and the observation of the feature in keyframe 6 will be ignored during further processing while other information about keyframe 6 may still be used in further processing.

The pre-processing module 106 also creates an array of inertial readings containing those inertial readings captured between and at the time of each successive pair of keyframes. That is, the module 106 receives the inertial readings from the IMU 104 and identifies readings that occur at or close to the time at which each keyframe was captured by the image sensor 102. The module 106 then identifies all readings that occurred between the time of each keyframe and its successor. Thus, the pre-processing module 106 generates a sequence of inertial readings, beginning with a reading at or close to the time at which the first keyframe in a window was captured, and ending with a reading at or close to the time at which the last keyframe in the window was captured, and containing all the inertial readings occurring between those endpoints. Each inertial reading includes six measurements (e.g., floating point numbers) the first three refer to the X, Y, and Z components of the linear acceleration measured by the accelerometer, and the second three refer to the roll, pitch, and yaw components of the angular velocity measured by the gyroscope.

The pre-processing module 106 also computes an initial estimate for the state of the device at the time the first keyframe is processed by the SWF. In some implementations, computation of the initial state estimate proceeds as follows. The accelerometer readings from a short initial period are averaged and normalized, and the roll and pitch orientation of the device is initialized to a rotation that maps the vector (0,0,1) to this average accelerometer reading, normalized to one, while the yaw can be set to any arbitrary value. The gyroscope readings from the same short initial period are averaged and the result is used as the initial estimate for the gyroscope bias. The initial position, velocity, and accelerometer biases are set to zero. The biases correspond to errors in the measurements of the motion sensing unit, which may change over time.

The pre-processing module 106 also computes a first estimate for the state of the device at the time of the second and subsequent keyframes, for example using a propagation algorithm. The propagation algorithm takes a sequence of inertial readings between a first time and a second time together with the inertial state of the device at the first time and produces an estimate for the inertial state of the device at the second time. This initial estimate generally has poor accuracy, but it is used by a subsequent processing step to compute a more accurate estimate for the state of the device.

The pre-processing module 106 also calculates an initial estimate of the position and/or orientation of objects proximate to the device using, e.g., a triangulation algorithm. A triangulation algorithm takes the location at which a single image feature is observed and matched in two, or more, different keyframes (provided in the feature tracks) together with the state of the device at the time of those two keyframes and produces an estimate of the 3D position of the image feature. The initial estimate generally has poor accuracy, but it is used by a subsequent processing step to compute a more accurate estimate for the 3D positions. The estimated 3D position of matched image features is expressed with respect to the pose of the device, or with respect to any other frame of reference. Furthermore, each 3D position of a matched image feature is considered an object or a portion of an object in the real world. As a result the initial estimate is an estimate of the position and/or orientation of objects proximate to the device.

For each window identified by the pre-processing module 106, the module 106 passes the feature track information (which includes the feature tracks, the binary vectors associated with the feature tracks, and the initial estimate of the 3D position of each matched image feature across the different keyframes representing position and/or orientation of objects proximate to the device) and the inertial data (which includes the sequence of inertial readings for the keyframes in each window and the initial estimate of the state of the device 100 at the time each keyframe was captured) to the SWF module 108.

The SWF module 108 can be electronic hardware, software, or a combination of both electronic hardware and software. The SWF module 108 includes several sub-modules that together are used to determine estimates of the position and/or orientation of objects proximate to the device, as well as estimates of the state of the device 100 at various points in time. The sub-modules include a bundle adjustment (BA) module 110, a sparse structure marginalization (SSM) module 112, and a delayed motion marginalization (DMM) module 114. The SWF module 108 processes data input from the pre-processing module 106 one window at a time. For each window the SWF module 108 maintains estimates of the state of the device at various points in time, as well as the 3D position of tracked image features that are representing the position and/or orientation of an object proximate to the device. These estimates are together known as the "model parameters". For example, the model parameters include variables representing the position and/or orientation of objects proximate to the device 100 and variables representing an estimate of the state (e.g., position, orientation, velocity, and/or inertial biases) for the device 100 at the time of one or more keyframes in the window. The SWF module 108 also maintains an information matrix H associated with the window that represents the information available regarding the current model parameters, where this information describes the confidence in the model parameters. Hence H is associated with a set of variables representing estimates of position and/or orientation of objects proximate to the device and another set of variables representing an estimate of the state of the device at the time (or close to the time) of each keyframe. The information matrix H may contain multiple different entries, with some entries representing the information about the first set of variables (confidence in position and/or orientation estimates), some entries representing the information about the second set of variables (confidence in the estimates of the device state), and some other entries representing shared information between the first and second set of variables in which the shared information represents shared confidence between the first and second set of variables. Further details related to information matrices may be found, e.g., in Triggs et. al, "Bundle Adjustment—A Modern Synthesis," pp. 1-71, Dec. 20, 2010, incorporated herein by reference in its entirety. When the SWF module 108 first operates, the module 108 is initialized with an estimate of the device state for one or more initial keyframes.

The BA module 110, the SSM module 112, and the DMM module 114 work in conjunction to update new model parameters as each new window is received. The BA module 110 maintains and outputs model parameters to a post-processing module 116. The SSM module 112 and DMM module 114 perform marginalization. The process of marginalization reduces the number of variables associated with the information matrix H and yields a new information matrix, into which a summary of information about the reduced variables has been folded. Hence some of the entries in H are summarized into other entries in H yielding a new smaller information matrix. It should be noted that the SWF module still maintains association between entries in the new information matrix; that is, it maintains association between variables that have not been summarized. In particular, the association between variables and entries in H is carried into the new information matrix by re-associating the entries in the new information matrix that were not summarized.

The purpose of marginalization is to transfer information within a previous window onto information within a new window, as well as information about a set of model parameters onto information about a subset of these model parameters. When the SWF module 108 receives a new window, the module 108 gains access to new feature tracks and inertial readings associated with new keyframes, but also drops feature tracks and inertial readings associated with older keyframes not present in the newer window. If the SWF module 108 never dropped any feature tracks or inertial readings then the processing time would grow without limit. Conversely, if the SWF module 108 dropped feature tracks and inertial readings without performing marginalization, then the calculated model parameter estimates would be suboptimal, in the sense of being made without consideration of relevant data from the past. Thus, by reducing the total number of model parameters over which the optimization problem is solved, marginalization reduces the computational burden of the SWF module 108, but also maintains a consistent model estimate over time by summarizing and transferring information between each window and the next.

The post-processing module 116, which receives the model parameters from the SWF module 108, can include various algorithms/programs and/or hardware that utilize the information contained in the model parameters depending on the user-application. For example, the post-processing module 116 may include a program that uses the model parameters output by the SWF module 108 to determine a path history of the device 100 and store the path history in device memory and/or overlay the path history on a map that is output to a display, such as shown in FIG. 1. That is, as each new set of model parameters is output by the SWF module 108, the post-processing module 116 takes the 3D feature position estimate and device state estimate determined for the device 100 at the time of each keyframe and adds those values to a collection (e.g., an array) of historical position and orientation values for the device 100. The position estimates may then be plotted by the device 100 on a map or other grid to illustrate the path travelled by the device.

Figure 3:
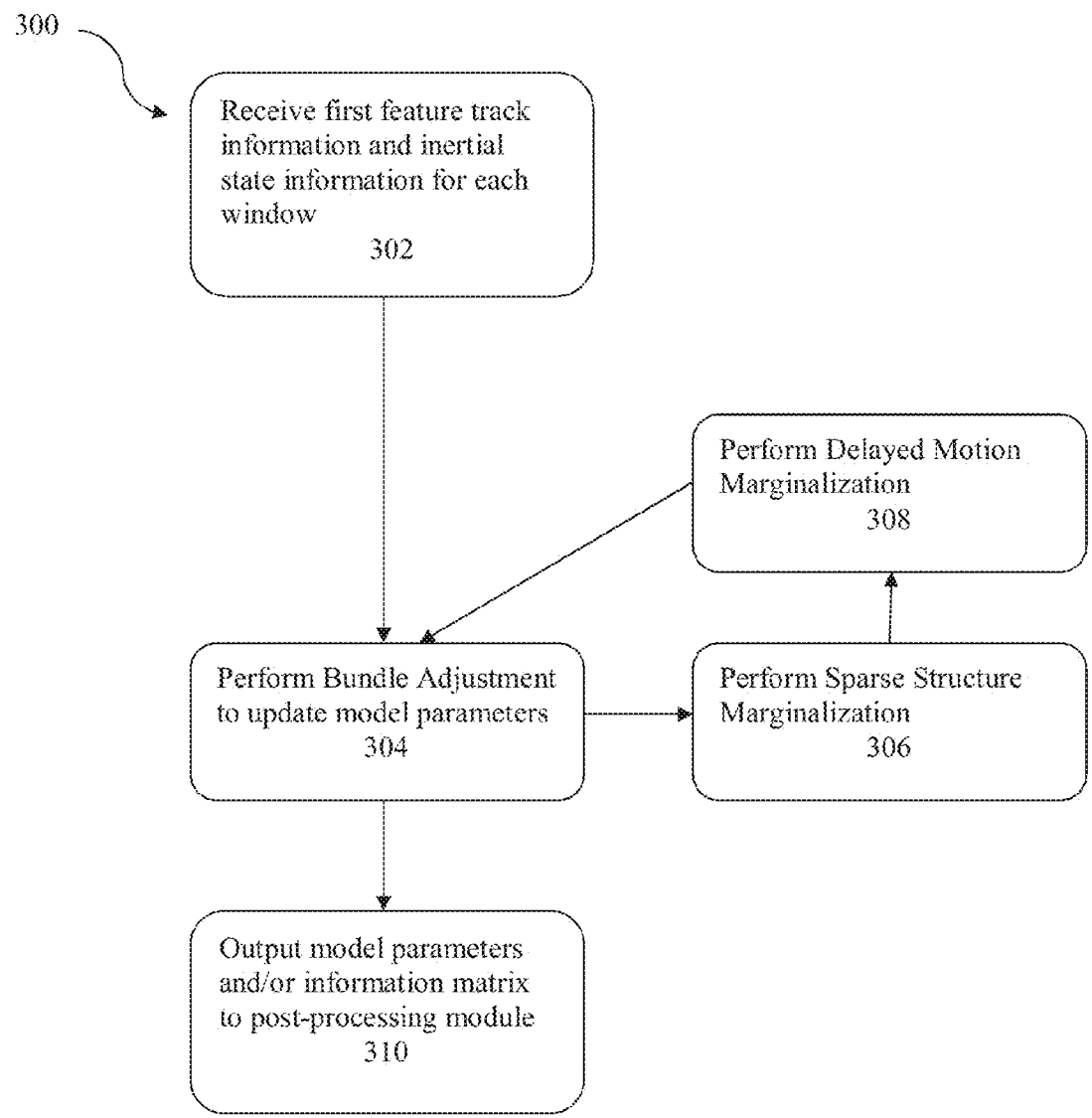
FIG. 3 is a flow chart illustrating an example process for calculating estimates of position and orientation using visual-based inertial navigation.

FIG. 3 is a flow chart illustrating an example process 300 for calculating estimates of model parameters performed by the SWF module 108. The process 300 is described with respect to the device 100 of FIG. 2. Upon receiving (302) the feature track information and inertial readings associated with each new window from the pre-processing module 106, the SWF module 108 provides that data to the BA module 110. The BA module 110 performs a bundle adjustment (304) to update the model parameters on the basis of the currently received feature tracks and inertial readings. To perform the adjustment, the BA module 110 also receives data relating to a previously calculated information matrix $H_{prior}$. In general, the prior information matrix $H_{prior}$ is computed by the DMM module 114 for a window received prior to the current window. Alternatively, $H_{prior}$ is calculated during the initialization of the visual-based inertial navigation procedure, when the SWF module 108 has not processed any previous window. The BA module 110 yields an updated estimate for the model parameters as well as an updated information matrix H representing the SWF module's information about the model parameters. Further details about bundle adjustment may be found, for example, in Triggs et. al, "Bundle Adjustment—A Modern Synthesis," incorporated herein by reference in its entirety.

After updating the model parameters and the information matrix H, the BA module 110 passes the model parameters and the information matrix H to the SSM module 112, which then proceeds to perform sparse structure marginalization (306). The purpose of sparse structure marginalization is to transfer information from the tracked features into information about the state of the device at the time of each keyframes within the current window. That is, the marginalization process performed by the SSM module 112 produces a revised information matrix of smaller size that contains multiple values representing the marginal information about the state of the device at the time of each keyframe in the current window. The marginalization of the tracked features' information hence reduces the computational burden of processing the information matrix in later steps. The revised information matrix can be a new matrix or can be maintained as the same original information matrix H where subsets of original information matrix H are marginalized into other subsets of that same matrix H and the marginalized subsets are ignored in later steps hence achieving the same result of reducing the computational burden of processing the information matrix in later steps.

The SSM module 112 outputs the revised matrix containing the marginal information values to the DMM module 114. The DMM module then performs delayed motion marginalization (308) on the revised matrix. The purpose of delayed motion marginalization is to project the information pertaining to device states for all but a specified number of keyframes, hence further reducing the size of the information matrix and the resulting computational burden for the device 100. In an alternate implementation, the DMM module 114 performs delayed motion marginalization with respect to a covariance matrix obtained from the revised information matrix, rather than the revised information matrix itself. In this implementation, the matrix inverse of the revised information matrix produced by the SSM module 112 is computed first, which yields a covariance matrix. Delayed motion marginalization is then performed on the covariance matrix, and the output matrix is inverted.

In either case, the output matrix from the DMM module 114 is passed back to the BA module 110 and used as the prior information matrix $H_{prior}$ in the next bundle adjustment procedure with respect to a new window identified by the pre-processing module 106. In addition for some windows received by the SWF module 108, post-processing module 116 may pull from the BA module 110 the updated corresponding model parameters and/or information matrix relating to those model parameters. For example, post-processing module 116 may pull the most recent model parameters from the BA module 110 to obtain an updated position of the device. For simplicity the process of post processing module 116 pulling most recent model parameters from the BA module can also be described as BA module outputting the information to post processing module 116 as shown in FIG. 3 block 310.

Figure 4:
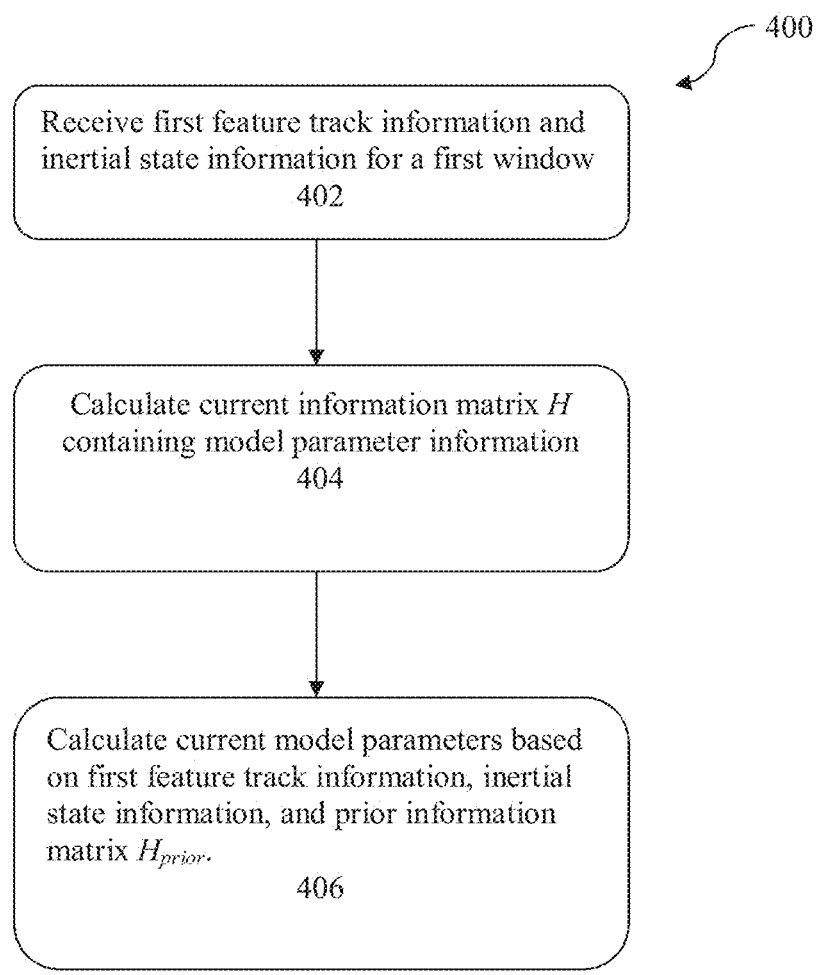
FIG. 4 is a flow chart illustrating an example process for performing bundle adjustment.

The following provides further details on the operations performed by the BA module 110, the SSM module 112 and the DMM module 114. FIG. 4 is a flow chart illustrating a process for performing bundle adjustment. As noted above, the BA module 110 first receives (402) feature track information and inertial readings for keyframes in a first window, as well as a prior information matrix $H_{prior}$. Using the received feature track information, inertial readings, and prior information matrix $H_{prior}$, the BA module 110 then updates model parameters and calculates (404) a current information matrix H associated with the model parameter (404).

An example of calculating the current information matrix H is described as follows. Let $x_{current}$ be the current model parameters, which are either computed during initialization by the pre-processing module or carried over from a previous iteration of bundle adjustment. A first Jacobian matrix $J_V$ is computed for the image features, relating $x_{current}$ to the image features. In particular, the entries of $J_V$ are computed as the first-order derivatives of the transformation from 3D feature positions to 2D image features. A residual vector $r_V$ is also computed for the image features. In particular, the entries of $r_V$ are computed as the differences between the location of each image feature and the location predicted by the current model parameters for each image feature. A second Jacobian matrix $J_I$ is computed for the inertial readings between each consecutive pair of keyframes in the current window. The second Jacobian matrix relates some of the model parameters of $x_{current}$ based on the inertial readings. In particular, the entries of $J_I$ are computed as the first-order derivatives of the propagation function described above. A residual vector $r_I$ is also computed for the inertial readings. In particular, the entries of $r_I$ are computed as the difference between the device state output by the propagation algorithm for each keyframe and the device state predicted by the current model parameters for each keyframe. A prior estimate $x_{prior}$ and information matrix $H_{prior}$ are provided as a result of the Delayed Motion Marginalization procedure performed on a previous window (or provided at initialization if this is the first window). A prior residual $r_{prior}$ is computed, where $r_{prior}$ represents the difference between the current estimate for the device state at the time of each keyframe and the prior estimate for the same. A Cholesky decomposition $L_{prior}$ of the prior information matrix $H_{prior}$ also is computed.

The current information matrix H then may be expressed as follows:

$$H = J_V^T J_V + J_I^T J_I + H_{prior} \quad (1)$$

where $J_V^T$ is the transpose of the first Jacobian matrix computed for the image features and $J_I^T$ is the transpose of the second Jacobian matrix computed for the inertial readings. The first, second, and third terms in the equation may correspond to matrices of different sizes. For example, due to the marginalization process to be described in more detail below, the prior information matrix $H_{prior}$ may be smaller than the first and second Jacobian matrices. In that case, rows and columns populated entirely of zeros are added to one or more of the three terms as appropriate to ensure that rows and columns in one term are associated with the same variable as the corresponding rows and columns in each other term.

The BA module 110 then calculates (406) new model parameters $x_{new}$ using the Jacobian matrices, residual vectors, prior residual $r_{prior}$, and Cholesky decomposition $L_{prior}$. An example of calculating the new model parameters is as follows. First, an estimate of the new model parameters for the current window is obtained by solving the following linear system using the Cholesky decomposition of matrix H:

$$H \delta x = -J_V^T r_V - J_I^T r_I - L_{prior}^T r_{prior} \quad (2)$$

$$x_{new} = x_{current} + \delta x \quad (3)$$

where $x_{current}$ refers to the existing model parameters for the current window, $x_{new}$ refers to the updated model parameters for the current window, $L_{prior}^T$ is the matrix transpose of $L_{prior}$, and $\delta x$ is a temporary variable used to store the update to the model parameters. In some variations of the system, equation (3) may be replaced with a non-Euclidean update operation. One example of a non-Euclidean update operation is a quaternion update, $$x_{new} = x_{current} \otimes \delta q \quad (4)$$

where $\delta q$ is a quaternion formed by appending the value 1 to the corresponding orientation error values stored in $\delta x$, and $\otimes$ represents quaternion multiplication. Another example of a non-Euclidean update operation is a rotation matrix update, $$R_{new} = R_{current}(I + [\delta x \times]) \quad (5)$$

where $R_{current}$ is a rotation matrix constructed from the values stored in $x_{current}$, $R_{new}$ is a rotation matrix constructed from the values stored in $x_{new}$, and the operation being performed is matrix multiplication. $[\delta x \times]$ represents the skew-symmetric matrix for $\delta x$, $$[v \times] = \begin{bmatrix} 0 & -v_3 & v_2 \\ v_3 & 0 & -v_1 \\ -v_2 & v_1 & 0 \end{bmatrix} \quad (6)$$

A third example of a non-Euclidean update operation is any combination of any number of Euclidean and non-Euclidean update operations applied separately to different sub-vectors within $x_{new}$, $x_{current}$, and $\delta x$.

After calculating the new model parameters for the current window, the BA module 110 evaluates a cost function that measures agreement between the model parameters for the current window and the current feature tracks and inertial readings. Various different cost functions known in the art may be utilized. The main requirement of the cost function is that the cost function has a greater value when the model parameters are inconsistent with the current feature tracks and inertial readings, and a lesser value when model parameters are consistent with the current feature tracks and inertial readings. For example, in some implementations, the cost function is evaluated as follows. A "predicted 2D location" for each image feature is computed by projecting the 3D position associated with the image feature into the keyframe in which the feature was observed, using the position and orientation associated with that keyframe by the current model parameters. This prediction is compared to the "observed" location of the feature as observed by the image sensor, and the squared Euclidean distance between the "predicted" and "observed" location is computed, which we will henceforth refer to as the error for this image feature.

Next, an error is computed for each keyframe in the current window as follows. Suppose a first keyframe of the current window was captured at time T and the next subsequent keyframe in the window was captured at time T+1. The state for the device at the time of keyframe T (as contained within the current model parameters) and the inertial readings captured between T and T+1 are used to compute a "predicted" state for the device at the time of keyframe T+1. The weighted squared difference between the predicted state for the device at the time of keyframe T+1 and the state for device at the time of keyframe T+1 stored within the current model estimate is computed, which we will henceforth refer to as the quadratic error term for keyframe T.

The cost associated with the current model estimate then is computed as the sum of quadratic errors for all image features plus the sum of quadratic errors for all keyframes. This cost is evaluated once for the model parameters $x_{new}$ and once for the model parameters $x_{current}$. If the cost associated with the model parameters $x_{new}$ is less than the cost associated with the model parameters $x_{current}$, then the new model estimate replaces the current model estimate. Otherwise, the new model estimate is rejected.

Many variations of the cost function are possible, including but not limited to the following. For example, in some implementations, a robust cost function may be used in place of the sum of squared differences for either or both of the image feature errors or keyframe errors. Examples of robust cost function are:

the L1 norm:

$$f(x) = 2b|x|;$$

the Huber function:

$$f(x) = x^2 \text{ for } |x| < b$$

$$f(x) = 2b|x| - b^2 \text{ otherwise};$$

or the Cauchy function:

$$f(x) = b^2 \log(1 + x^2/b^2)$$

In some implementations, domain-specific knowledge may be inserted into the cost function. For instance, in a particular application it may be known that the device performing the visual-based inertial navigation moves only on a horizontal plane, with its altitude remaining fixed, or that changes in the velocity of the device are limited by the inertial characteristics of the device itself. Such constraints can be incorporated by using cost terms that take on large values for model estimates inconsistent with the domain-specific knowledge and small values for model estimates consistent with the domain-specific knowledge.

At this point, the absolute difference between the cost for $x_{new}$ and the cost for $x_{current}$ is computed, and if this difference is less than a threshold $\gamma$ or the number of repetitions of the bundle adjustment process exceeds an upper bound $N_{max}$, then the bundle adjustment process is complete, in which case the current value for $x_{current}$ is output by the BA module 110 as the final position and orientation estimate and processing continues with the sparse structure marginalization described below. That is, after applying bundle adjustment to a set of feature tracks and inertial readings, the BA module 110 outputs the current model parameters, which contain estimates of the state of the device 100 at the time of each keyframe within the current window and estimates of the 3D location of the observed image features. The output of the BA module 110 also includes values representing confidence (or certainty) in the model parameters, in the form of the current information matrix H that is associated with the model parameters. Otherwise, if the absolute difference between the cost $x_{new}$ and the cost for $x_{current}$ is greater than the threshold $\gamma$ and the number of repetitions of the bundle adjustment process is less than the upper bound $N_{max}$, then a further iteration of bundle adjustment is performed and the SWF module 110 resumes processing from the beginning of the bundle adjustment process, starting with computation of the Jacobian matrices, and proceeding as described above.

Figure 5:
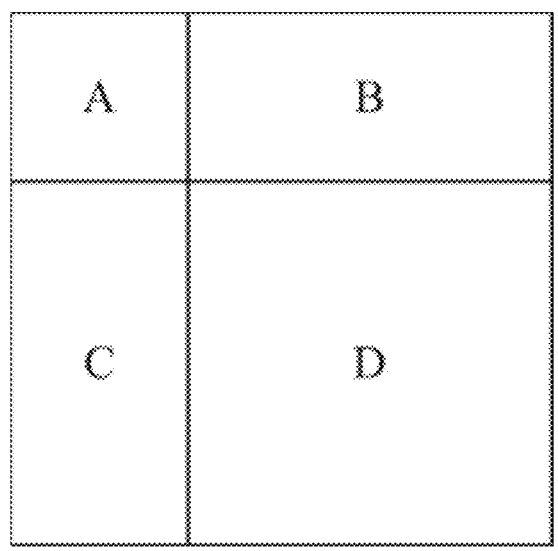
FIG. 5 is a schematic illustrating an example of an information matrix.

Upon completing the bundle adjustment process, the current information matrix H is passed to the SSM module 112. FIG. 5 is a schematic illustrating an example of an information matrix. The information matrix H contains information about the model parameters, which is information about the state of the device at the time of each keyframe, and information about the 3D positions and/or orientation of objects proximate to the device. As shown in the example of FIG. 5, the information matrix H may be arranged into different groupings A, B, C, and D. The grouping A includes values corresponding to the device state estimates. The grouping D includes values corresponding to the estimates about the position and/or orientation of objects proximate to the device (e.g., the 3D feature positions). Groups B and C include values that correspond to shared information between the device state estimates in A and the feature positions in D. The information matrix H is symmetric, so the grouping C is the matrix transpose of B.

Figure 6:
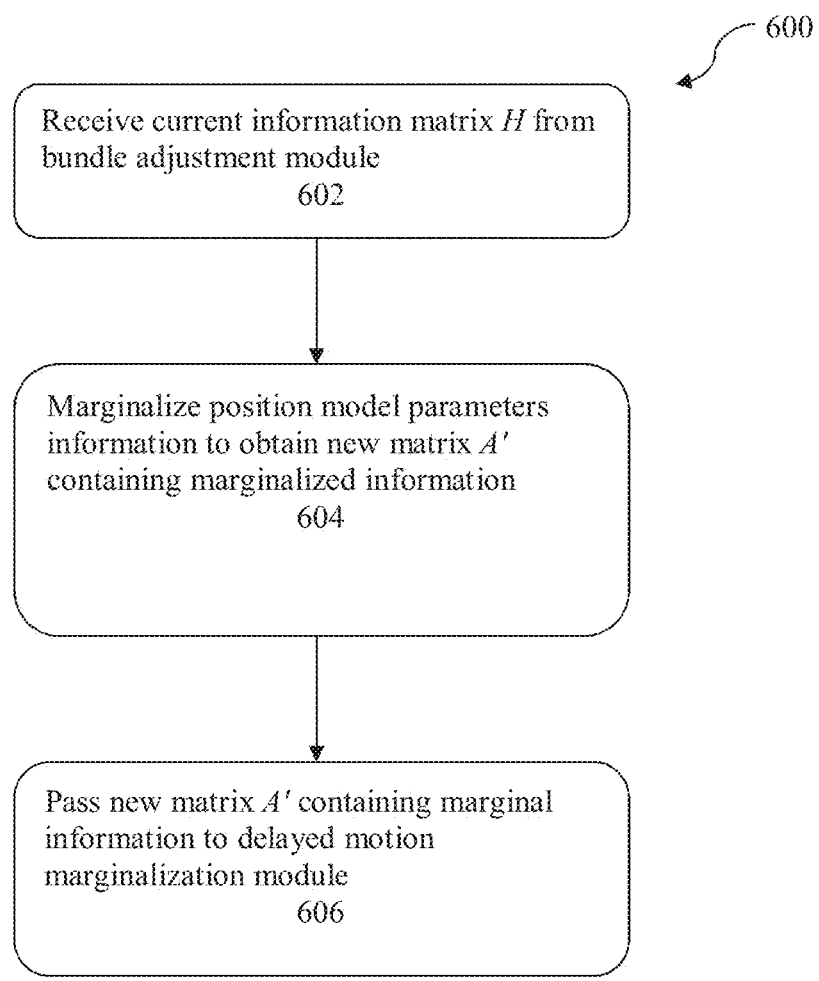
FIG. 6 is a flow chart illustrating an example process for performing sparse structure marginalization.

The SSM module 112 performs the first part of marginalizing the information matrix H. FIG. 6 is a flow chart illustrating an example process 600 for performing sparse structure marginalization. First, the SSM module receives (602) the information matrix H and for the current window from the BA module 110. Then, the SSM module marginalizes (604) the subsets of the information matrix H associated with variables representing position and/or orientation of objects proximate to the device i.e., groups B, C, and D from FIG. 5. A summary of information pertaining to the marginalized variables is then kept in a new matrix A'. As an example, marginalizing B, C, and D may be computed using the Schur complement, which can be expressed as:

$$A' = A - BD^{-1}C \quad (7)$$

Figure 7:
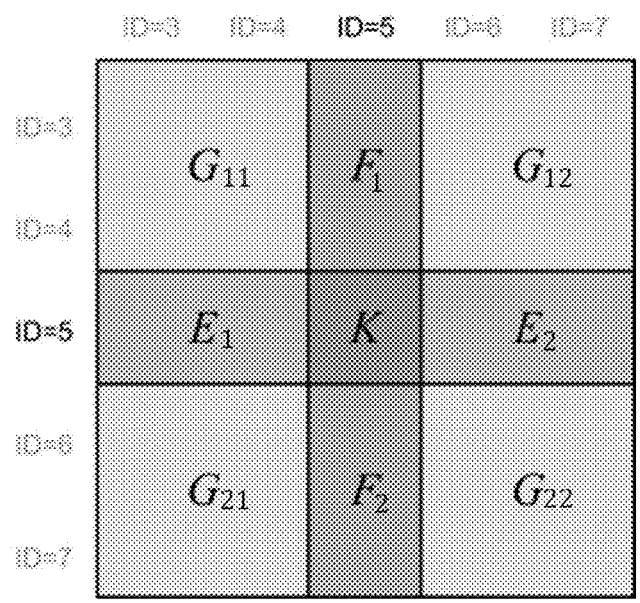
FIG. 7 is a schematic illustrating an example of a second information matrix.

Here, the SSM module 112 takes advantage of the sparse structure of H. In particular, the submatrix A is block tridiagonal and D is block diagonal. The SSM module 112 considers only the terms of the Schur complement that are non-zero, which significantly decreases computation time. Thus, the output of the SSM module 112 from this process is a new information matrix A' representing the marginal information about the device state at the time of each keyframe. The values contained in A' are "marginal information values." An example of the new matrix A' is shown in FIG. 7 and the subsets of that matrix are further explained below. The new matrix A' is then passed (606) to the delayed motion marginalization module 114.

Figure 8:
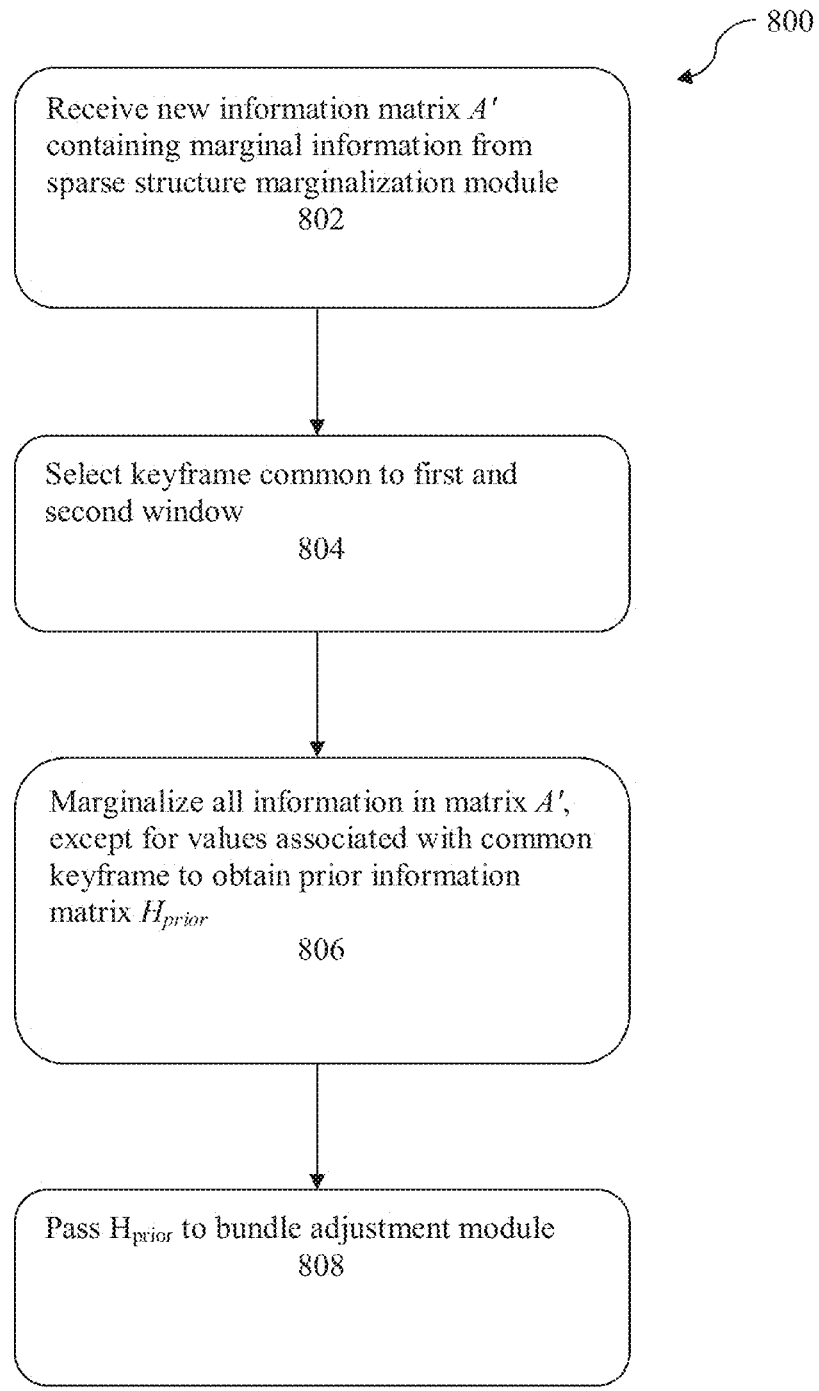
FIG. 8 is a flow chart illustrating an example process for performing delayed motion marginalization.

FIG. 8 is a flow chart illustrating an example process 800 for performing delayed motion marginalization. The DMM module 114 receives (802) the new information matrix A' from the SSM module 112, where the DMM module 114 performs the second part of the marginalization process, i.e., delayed motion marginalization. During the marginalization process, the DMM module 114 eliminates the information associated with variables representing the device state estimates for all but one keyframe. First, however, the DMM module selects (804) a keyframe that is common to the current window and new window to be processed by the SWF module 108. In order to perform this operation, the DMM module 114 needs to know which of the frames in the current window will also be present in the next window. For this reason, the selection of the common keyframe does not occur until the next window arrives. Preferably, the earliest frame that is present in both windows is selected as the common keyframe. However, other frames that are present in both windows may also be selected as the common keyframe. In some implementation more than one common keyframe may be selected and more than one keyframe will be used to transfer information between the windows.

As an example, assume the current window is $W_1$ and the next window to arrive is $W_2$. Once the information from $W_2$ (i.e., feature tracks and inertial state information) arrives at the SWF module 108, the DMM module 114 associates frames in $W_1$ with frames in $W_2$ using a list of frame identifiers (e.g., integers). Let the earliest frame that is present in both $W_1$ and $W_2$ be designated with the frame identifier F0. In particular, suppose that $W_1$ contains frames (3,4,5,6,7) and $W_2$ contains frames (5,6,7,8,9). In this case F0=frame 5 because frame 5 is the earliest frame that is present in both windows.

Once the common keyframe is selected, the DMM module 114 marginalizes (806) the subset of the information matrix A' associated with the variables representing the state of the device, except for the subset of A' associated with the variables that are representing the state of the device at the selected common keyframe. FIG. 7 is an example drawing illustrating the arrangement of the matrix A'. As depicted in the figure, the matrix A' includes the marginal information values associated with variables representing the device state at the time of each keyframe as well as shared information terms between variables representing the device state at the times of each pair of keyframes. The matrix A' may be subdivided into four sub-matrices: a block K corresponding to the rows and columns associated with the selected frame F0 that is common to both $W_1$ and $W_2$; blocks $G_{11}$, $G_{12}$, $G_{21}$, $G_{22}$ which contains information about frames that do not include the selected frame as well as shared information terms between them; and blocks $F_1$, $F_2$, $E_1$, $E_2$ that contain shared information terms between the selected frame F0 and frames other than the selected frame F0.

The goal of the delayed motion marginalization is to marginalize blocks $F_1$, $F_2$, $E_1$, $E_2$, and $G_{11}$ $G_{12}$ $G_{21}$ $G_{22}$ and summarize this information in a new matrix with size equal to that of K. The new matrix K' may be determined by computing the Schur complement, and can be expressed as:

$$K' = K - EG^{-1}F \quad (8)$$

wherein:

$$G = \begin{bmatrix} G_{11} & G_{12} \\ G_{21} & G_{22} \end{bmatrix}, \quad (9)$$

$$F = \begin{bmatrix} F_1 \\ F_2 \end{bmatrix}, \quad (10)$$

$$E = [E_1 \ E_2] \quad (11)$$

The DMM module 114 then scales K' by dividing the values in K' by a constant (808) in order to maintain consistency and avoid cases of overconfidence. For example, in some implementations, the constant is equal to the window size (e.g., the number of measurements in the window or the period of time with which the window is associated). The values within K' are referred to as the common frame marginal information values. The resulting matrix K' may also be referred to as $H_{prior}$. $H_{prior}$ then is used as the prior information matrix by the BA module 110 for the next window. Thus, the information matrix generated by the SWF module 108 during the bundle adjustment process, the sparse structure marginalization process, and the delayed motion marginalization process, is now used as input to the filter in its next iteration as a prior information matrix and thereby facilitates a transfer of information between the iterations of the filter and between the windows. The filter now also contains an updated estimate for the state of the device that can be output to or obtained by post-processing module 116.

In some implementations, the delayed motion marginalization of the revised matrix A' may be alternatively performed as follows: first, the DMM module 114 obtains the matrix inverse of A', which can be expressed as:

$$\Sigma = A'^{-1} \quad (12)$$

Next, the matrix Σ is divided into the sub-blocks as shown in FIG. 7, the sub-block K is extracted, and the matrix K' is computed according to $$K' = K^{-1} \qquad (13)$$

The matrix K' is then processed as described above, including division by a constant in order to maintain consistency of the SWF.

The matrix K' is of substantially smaller dimensions than the original information matrix H. As an example, if the information matrix H initially has a size of 1000×1000, then performing the sparse structure marginalization using the SSM module 112 may reduce the matrix to a size of 150×150. After applying delayed motion marginalization, the matrix can be further reduced to a size of 15×15.

Applications

The sliding window inverse filter (SWF) module described herein (e.g., SWF module 108) may be used as part of various visual-based inertial navigation applications. For example, in some implementations, the SWF module is incorporated into a mobile electronic computing device having a visual display. The position and orientation estimates determined by the SWF module can be output to the display as points on a map (e.g., before or after post-processing) to provide a user of the electronic computing device visual information about the device's current and past positions. In some cases, the SWF module is configured to be a part of the electronic computing device that is being moved. In other implementations, the SWF module is separate from the electronic computing device, e.g., the SWF module may be operating on a server, whereas the IMU and image sensor are in the electronic computing device. The feature tracks and inertial data from the electronic computing device may then be transmitted to the SWF module on the server, where the SWF module then calculates the position and orientation estimates. The server may be an internet server that updates to a website the position and orientation information of the electronic computing device in real-time. This information can also be used combined with additional information such as depth information of the environment being imaged and produce a 3D map of the places being traversed.

In some implementations, the position and orientation estimates can be used to track objects that have at one point been imaged by the image sensor. For example, the pre-processing module 106 may identify one or more objects (e.g., keys, wallet, etc.) within an image captured by the image sensor and then use the position and orientation data from the SWF module to maintain the last known position of the object when the object is no longer in the field of view of the image sensor. Should the user forget where the object was or how to return to the location where the object was identified, an electronic computing device may output (e.g., to a display) the last known position of the object and/or a path the user can follow to return to the object.

In some implementations, the interior/exterior of a building (e.g., a warehouse, shopping mall or residential home) is traversed using an electronic computing device having a visual-based inertial navigation system according to the present disclosure to record a map of the building. The electronic computing device may store the position and orientation information provided by the SWF module, while also collecting additional information from sources such as, for example, WiFi signals, BlueTooth signals, signals generated by beacons, Near Field Communications (NFC), among others. The accurate location and orientation of the electronic computing device may then be used to create a map of the signals in the different locations within the structure.

In some implementations, an area (e.g., a house, backyard, building interior) may be traversed using an electronic computing device having the visual-based inertial navigation system according to the present disclosure to create a three-dimensional (3D) map of the area without requiring additional sensors beyond the image sensor and inertial measurement unit of the device itself. This is because the information generated by the SWF module may include 3D information about the device and the device's external environment. In some cases, the accuracy of the 3D mapping produced using the visual-based inertial navigation system may be improved using information coming from additional sensors incorporated into the electronic computing device, such as depth sensors.

Figure 10:
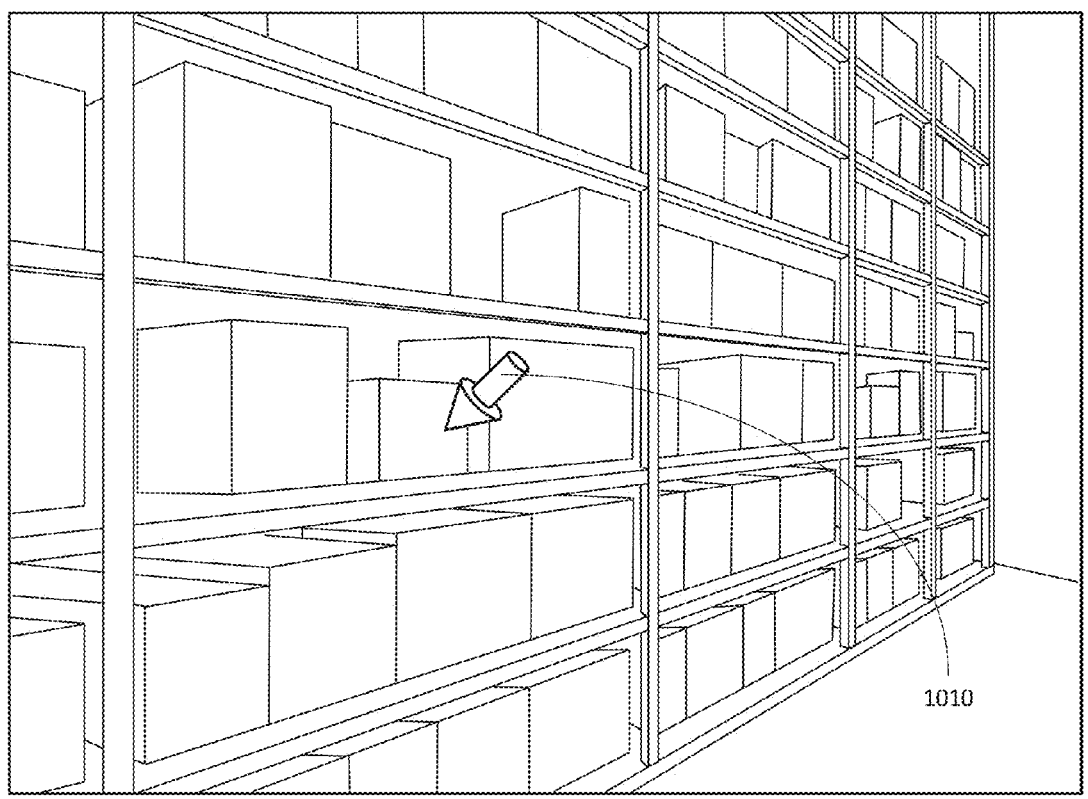
FIG. 10 is an example of an image output by a display of a device that includes a visual-based inertial navigation system, in which a virtual arrow is overlaid on the image.

In some implementations, the SWF module can be used to direct a user toward an object. FIG. 10 is an example of a display output by an electronic computing device showing an image of an area of a store, in which a graphical arrow 1010 is overlaid on the photo and points to the position of an item in the store. The visual-based inertial navigation system as disclosed herein can be used to calculate the position and orientation of the electronic computing device relative to the item, so that the arrow is always pointing in a direction to the item in the location of the item, where the location of the item is known in advance and the location and orientation of the device is calculated with the SWF module. The arrow guides the user to the item that needs to be picked up.

Figure 11:
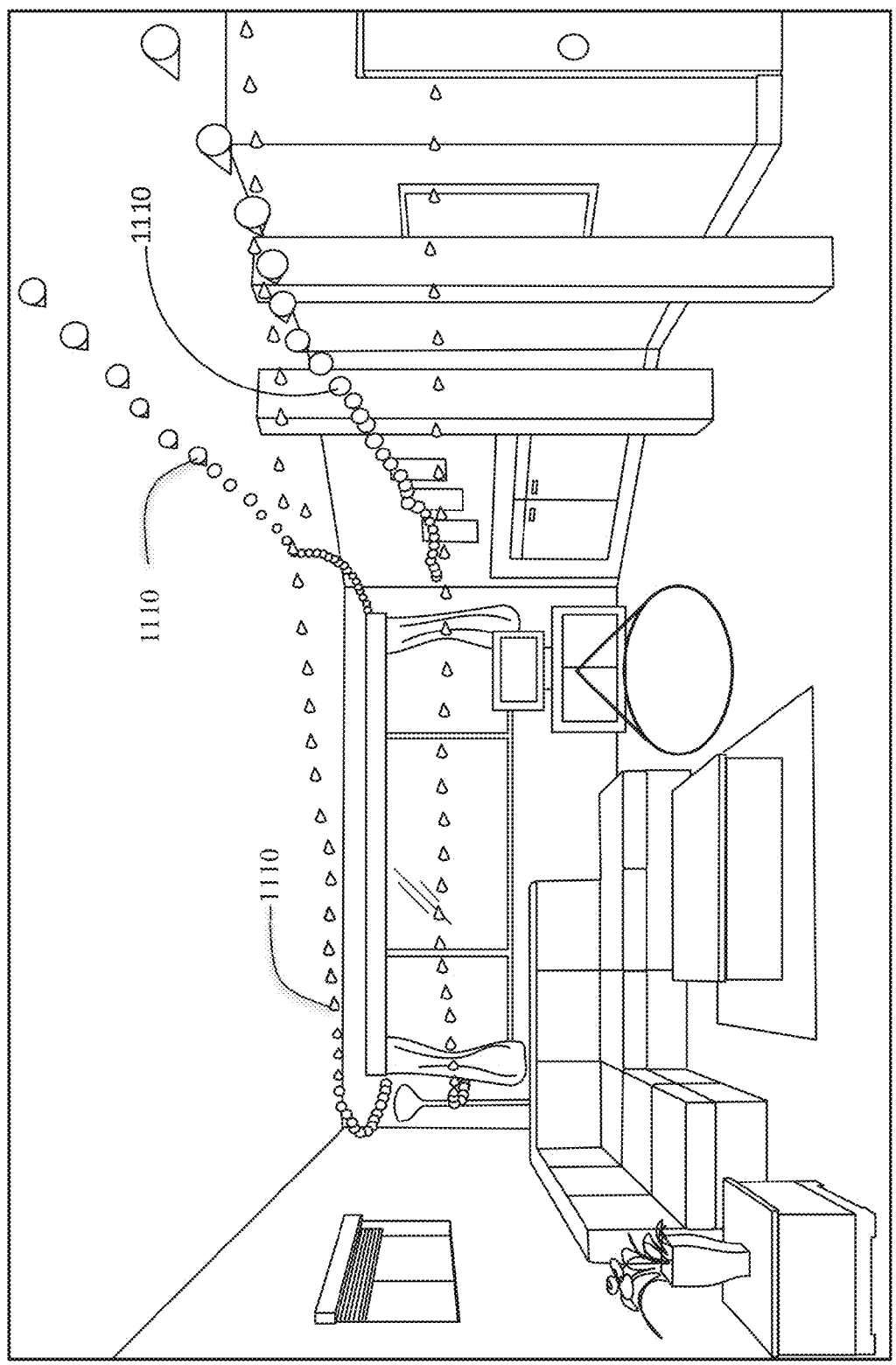
FIG. 11 is an example of an image output by a display of a device that includes a visual-based inertial navigation system, in which a virtual path is overlaid on the image.

In some implementations, the SWF module provides accurate position and orientation of an electronic computing device to allow a user to track their movement. FIG. 11 is an example of an image output by a display of an electronic computing device that includes a visual-based inertial navigation system, in which a virtual path 1110 is overlaid on the image. The virtual path is calculated by the visual-based inertial navigation system as a guide for the user to follow while holding, carrying or wearing the electronic computing device.

Hardware and Software

Figure 9:
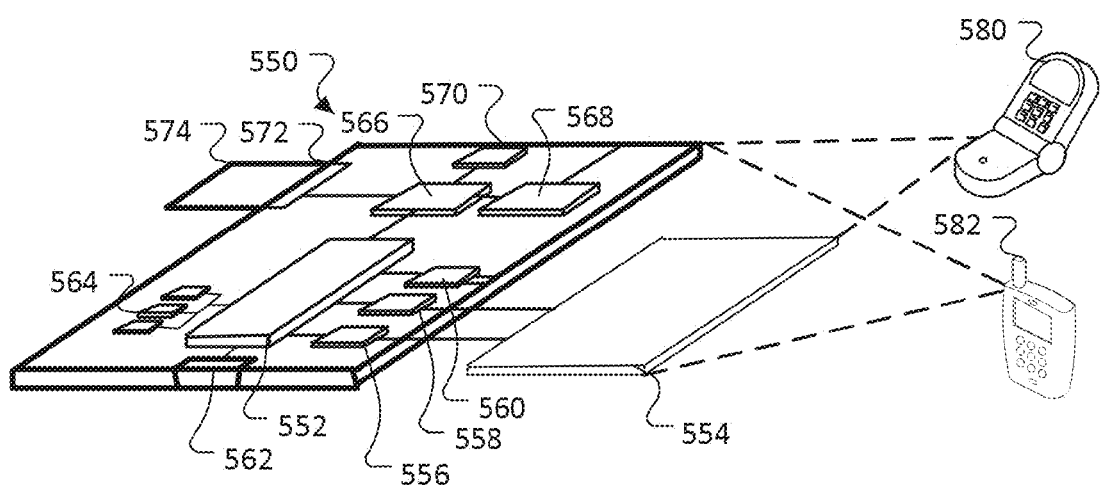
FIG. 9 is a schematic that illustrates an example of a mobile computing device, which may be used with the techniques described herein.

FIG. 9 shows an example of an electronic computing device 550, which may be used with the techniques described here. For example, referring to FIG. 2, the mobile electronic computing device 100 could be an example of the device 550. Electronic computing device 550 is intended to represent various forms of electronic computing devices, such as personal digital assistants, cellular telephones, smartphones, smart glasses, and other similar computing devices. The components shown here, their connections and relationships, and their functions, are meant to be examples only, and are not meant to limit implementations of the techniques described and/or claimed in this document.

Electronic computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near-area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, and so forth) and may also include sound generated by applications operating on device 550.

The computing device 550 may be implemented in multiple different forms, as shown in the figure. For example, it may be implemented as a cellular telephone 580. It may also be implemented as part of a smartphone 582, personal digital assistant, tablet computer, smart glasses, smart watch, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a device having a display (e.g., liquid crystal display monitor) for displaying information to the user. The display may also be used for receiving information from the user (e.g., a touchscreen). The device may have other input devices such as a keyboard and/or pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback). Input from the user can be received in any form, including acoustic, speech, or tactile input.

Multiple implementations have been described. Nevertheless, it will be understood that various modifications may be made without departing from the spirit and scope of the invention. Other implementations are within the scope of the following claims.

What is claimed is:

1. An electronic computing system for performing navigation, the electronic computing system comprising an electronic processor and memory operable to implement a sliding-window inverse filter module, wherein the sliding-window inverse filter module is configured to:
    receive sensor measurements from a pre-processing module, wherein the sensor measurements comprise image data and inertial data for a device;
    transfer information, derived from the sensor measurements, from a first set of variables associated with a first window of time to a second set of variables associated with a second window of time, wherein the first and second windows consecutively overlap in time; and
    output, to a post-processing module, a state of the device based on the transferred information,
    wherein each window in the pair is associated with a corresponding first information matrix, and each first information matrix is for a plurality of first variables representing a position and/or orientation of at least one object proximate to the device and a plurality of second variables representing a state of the device at two or more points in time, and wherein transferring the information comprises:

marginalizing at least a subset of the first variables associated with the first information matrix of the first window to obtain a second information matrix, which still maintains the association with the plurality of second variables;

marginalizing a subset of the second variables associated with the second information matrix to obtain a third information matrix; and scaling the third information matrix to obtain a fourth information matrix, wherein the fourth information matrix is a summarized representation of the information about the state of the device and of the position and/or orientation of the objects proximate to the device at points in time when the first window and the second window in the pair overlap.

2. The electronic computing system of claim 1, further comprising:

the pre-processing module;

an image detection unit coupled to the pre-processing module, wherein the pre-processing module is configured to receive a plurality of images captured by the image detection unit and derive the image data from the plurality of images; and a motion sensing unit coupled to the pre-processing module, wherein the pre-processing module is configured to receive the inertial data from the motion sensing unit.

3. The electronic computing system of claim 1, wherein a subset of the first set of variables associated with the first window overlaps in time with a subset of the second set of variables associated with the second window.

4. The electronic computing system of claim 3, wherein the overlap between the first set of variables and the second set of variables is at the earliest time that is present in both the first and second windows.

5. The electronic computing system of claim 1, wherein, for each window, the plurality of first variables represents 3D positions and/or orientations of image features across a plurality of images, and wherein, for each window, the plurality of second variables comprises linear acceleration data and angular velocity data.

6. The electronic computing system of claim 5, wherein the state of the device further comprises biases for the motion sensing unit.

7. The electronic computing system of claim 1, wherein the first information matrix associated with each window comprises:

first information about at least one variable representing an estimate for a position or orientation of an object proximate to the device; and second information about at least one variable representing an estimate of the state of the device; and shared information between the first information and the second information.

8. The electronic computing system of claim 7, wherein the shared information represents shared confidence between the estimates of a position or orientation of an object proximate to the device and the estimate of the state of the device.

9. The electronic computing system of claim 7, wherein marginalizing at least the subset of the first variables associated with the first information matrix of the first window comprises marginalizing the shared information, and wherein scaling the third information matrix comprises dividing or multiplying the third information matrix by a constant.

10. The electronic computing system of claim 9, wherein the constant is equal to a size of the first window.

11. A computer-implemented method comprising:

receiving sensor measurements from a pre-processing module, wherein the sensor measurements comprise image data and inertial data for a device;

transferring, using a processor, information derived from the sensor measurements, from a first set of variables associated with a first window of time to a second set of variables associated with a second window of time, wherein the first and second windows consecutively overlap in time; and outputting, to a post-processing module, a state of the device based on the transferred information, wherein each window in the pair is associated with a corresponding first information matrix, and each first information matrix is for a plurality of first variables representing a position and/or orientation of at least one object proximate to the device and a plurality of second variables representing a state of the device at two or more points in time, and wherein transferring the information comprises:

marginalizing at least a subset of the first variables associated with the first information matrix of the first window to obtain a second information matrix, which still maintains the association with the plurality of second variables;

marginalizing a subset of the second variables associated with the second information matrix to obtain a third information matrix; and scaling the third information matrix to obtain a fourth information matrix, wherein the fourth information matrix is a summarized representation of the information in the state of the device and of the position and/or orientation of the objects proximate to the device at points in time when the first window and the second window in the pair overlap.

12. The computer-implemented method of claim 11, wherein a subset of the first set of variables associated with the first window overlaps in time with a subset of the second set of variables associated with the second window.

13. The computer-implemented method of claim 12, wherein the overlap between the first set of variables and the second set of variables is at the earliest time that is present in both the first and second windows.

14. The computer-implemented method of claim 11, wherein, for each window, the plurality of first variables represents 3D positions and/or orientations of image features across a plurality of images, and wherein, for each window, the plurality of second variables comprises linear acceleration data and angular velocity data.

15. The computer-implemented method of claim 14, wherein the state of the device further comprises biases for the motion sensing unit.

16. The computer-implemented method of claim 11, wherein the first information matrix associated with each window comprises:

first information about at least one variable representing an estimate for a position or orientation of an object proximate to the device; and second information about at least one variable representing an estimate of the state of the device; and shared information between the first information and the second information.

17. The computer-implemented method of claim 16, wherein the shared information represents shared confidence between the estimates of a position or orientation of an object proximate to the device and the estimate of the state of the device.

18. The computer-implemented method of claim 16,
wherein marginalizing at least the subset of the first variables associated with the first information matrix of the first window comprises marginalizing the shared information, and
wherein scaling the third information matrix comprises dividing or multiplying the third information matrix by a constant.

19. The computer-implemented method of claim 18, wherein the constant is equal to a size of the first window.

20. A non-transitory computer storage medium encoded with computer program instructions that when executed by one or more electronic computing devices cause the one or more electronic computing devices to perform operations comprising:
receiving sensor measurements from a pre-processing module, wherein the sensor measurements comprise image data and inertial data for a device;
transferring, using a processor, information derived from the sensor measurements, from a first set of variables associated with a first window of time to a second set of variables associated with a second window of time, wherein the first and second windows consecutively overlap in time; and
outputting, to a post-processing module, a state of the device based on the transferred information,
wherein each window in the pair is associated with a corresponding first information matrix, and each first information matrix is for a plurality of first variables representing a position and/or orientation of at least one object proximate to the device and a plurality of second variables representing a state of the device at two or more points in time, and
wherein transferring the information comprises:
marginalizing at least a subset of the first variables associated with the first information matrix of the first window to obtain a second information matrix, which still maintains the association with the plurality of second variables;
marginalizing a subset of the second variables associated with the second information matrix to obtain a third information matrix; and
scaling the third information matrix to obtain a fourth information matrix,
wherein the fourth information matrix is a summarized representation of the information about the state of the device and of the position and/or orientation of the objects proximate to the device at points in time when the first window and the second window in the pair overlap.

21. The medium of claim 20, wherein a subset of the first set of variables associated with the first window overlaps in time with a subset of the second set of variables associated with the second window.

22. The medium of claim 21, wherein the overlap between the first set of variables and the second set of variables is at the earliest time that is present in both the first and second windows.

23. The medium of claim 20, wherein, for each window, the plurality of first variables represents 3D positions and/or orientations of image features across a plurality of images, and
wherein, for each window, the plurality of second variables comprises linear acceleration data and angular velocity data.

24. The medium of claim 23, wherein the state of the device further comprises biases for the motion sensing unit.

25. The medium of claim 20, wherein the first information matrix associated with each window comprises:
first information about at least one variable representing an estimate for a position or orientation of an object proximate to the device; and
second information about at least one variable representing an estimate of the state of the device; and
shared information between the first information and the second information.

26. The medium of claim 25, wherein the shared information represents shared confidence between the estimates of a position or orientation of an object proximate to the device and the estimate of the state of the device.

27. The medium of claim 25, wherein marginalizing at least the subset of the first variables associated with the first information matrix of the first window comprises marginalizing the shared information, and
wherein scaling the third information matrix comprises dividing or multiplying the third information matrix by a constant.

28. The medium of claim 27, wherein the constant is equal to a size of the first window.

* * * * *